United States Patent
Haggerty et al.

(10) Patent No.: US 9,350,471 B1
(45) Date of Patent: May 24, 2016

(54) SYSTEMS AND METHODS FOR TRANSMITTING AND RECEIVING LARGE OBJECTS VIA DIGITAL RADIO BROADCAST

(71) Applicant: iBiquity Digital Corporation, Columbia, MD (US)

(72) Inventors: Joseph P Haggerty, Madison, NJ (US); Chinmay M Shah, Piscataway, NJ (US); Marek Milbar, Huntingdon Valley, PA (US); James C Stekas, Berkeley Heights, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 59 days.

(21) Appl. No.: 14/064,971

(22) Filed: Oct. 28, 2013

Related U.S. Application Data

(62) Division of application No. 12/003,315, filed on Dec. 21, 2007, now Pat. No. 8,595,748.

(51) Int. Cl.
*H04H 20/00* (2009.01)
*G06F 9/54* (2006.01)

(52) U.S. Cl.
CPC ............... *H04H 20/00* (2013.01); *G06F 9/546* (2013.01)

(58) Field of Classification Search
CPC .................................. G06F 9/546; H04H 20/00
See application file for complete search history.

(56) References Cited

U.S. PATENT DOCUMENTS

| | | | |
|---|---|---|---|
| 6,597,918 B1 | 7/2003 | Kim | |
| 6,629,124 B1 * | 9/2003 | Iwasaki et al. | 709/200 |
| 7,149,750 B2 | 12/2006 | Chadwick | |
| 7,305,043 B2 | 12/2007 | Milbar | |
| 2002/0106987 A1 * | 8/2002 | Linden | H04H 20/30 455/12.1 |
| 2003/0058815 A1 * | 3/2003 | Shen et al. | 370/329 |
| 2003/0177142 A1 | 9/2003 | Ferris | |
| 2006/0184667 A1 * | 8/2006 | Clubb et al. | 709/224 |
| 2006/0209941 A1 | 9/2006 | Kroeger | |
| 2007/0066311 A1 * | 3/2007 | Reibel et al. | 455/445 |
| 2007/0198731 A1 | 8/2007 | Li et al. | |
| 2007/0249379 A1 * | 10/2007 | Bantukul | 455/466 |
| 2008/0086491 A1 | 4/2008 | Wang et al. | |
| 2008/0140783 A1 * | 6/2008 | Williams et al. | 709/206 |
| 2008/0301318 A1 | 12/2008 | McCue et al. | |

(Continued)

OTHER PUBLICATIONS

ETSI "Digital Audio Broadcasting (DAB); Multimedia Object Transfer (MOT) protocol" Feb. 2005 pp. 1-76.*

(Continued)

*Primary Examiner* — Charles E Anya
(74) *Attorney, Agent, or Firm* — Jones Day

(57) ABSTRACT

Methods and systems for transmitting and receiving large objects via digital radio broadcast involve retrieving an object and an object description; assigning a unique identifier to the object; segmenting the object into a plurality of fragments; generating at least one long message having selected ones of the fragments and a long header including the unique identifier and the object description; generating at least one short message having selected ones of the fragments and a short header including the unique identifier; and communicating the at least the long message or the short message to a digital radio broadcast transmitter. In accordance with certain embodiments, reassembly of the object can begin with either a long message or a short message.

28 Claims, 21 Drawing Sheets

(56) References Cited

U.S. PATENT DOCUMENTS

2009/0111433 A1* 4/2009 Muhonen et al. .......... 455/414.1
2009/0147139 A1 6/2009 Watanabe et al.

OTHER PUBLICATIONS

National Radio Systems Committee, NRSC-5-A In-Band/on-channel Digital Radio Broadcasting Standard, Sep. 2005, retrieved from the internet on May 29, 2015 at http://www.nrscstandards.org/nrsc-5-a.asp.

European Telecommunications Standards Institute, TS 102 818 v. 1.2.1 Digital Audio Broadcasting (DAB); XML Specification for DAB Electronic Programme Guide (EPG), Jan. 2005.

European Telecommunications Standards Institute, TS 301 234 v. 2.1.1 Digital Audio Broadcasting (DAB); Multimedia Object Transfer (MOT) protocol, Feb. 2005.

European Telecommunications Standards Institute, TS 102 371 v. 1.1.1 Digital Audio Broadcasting (DAB); Transportation and Binary Encoding Specification for DAB EPG, Jan. 2005.

Thom Linden, An Advanced Application Services Framework for Application and Service Developers using HD Radio Technology, White Paper, Feb. 2003, retrieved from the internet on May 29, 2015 at https://www.ibiquity.com/sites/ default/files/sy_tn_5032_000.pdf.

* cited by examiner

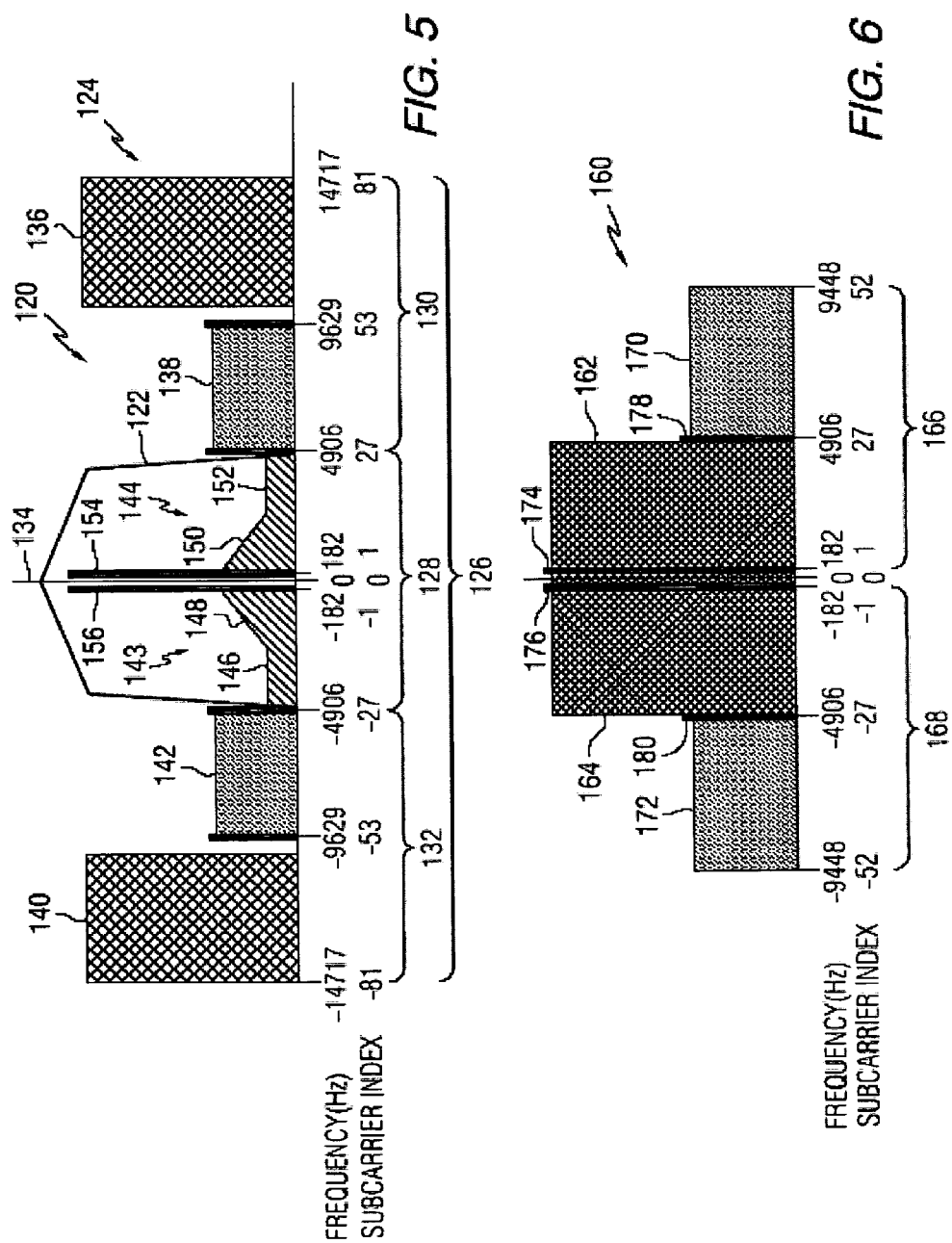

*FIG. 15*

| BYTE # | MSB 7 | 6 | 5 | Bit Position 4 | 3 | 2 | 1 | LSB 0 |
|---|---|---|---|---|---|---|---|---|
| | | | | FIELD NAMES | | | | |
| 0 | hdrLen ||||||||
| 1 | repeat ||||||||
| 2-3 | LotID ||||||||
| 4-7 | position ||||||||
| 8-11 | version ||||||||
| 12-15 | discardTime ||||||||
| 16-19 | fileSize ||||||||
| 20-23 | mimeHash ||||||||
| 24-25 ... ≤ 255 | fileName ||||||||

| BYTE # | MSB | | | Bit Position | | | | LSB |
|---|---|---|---|---|---|---|---|---|
| | 7 | 6 | 5 | 4 | 3 | 2 | 1 | 0 |
| | FIELD NAMES | | | | | | | |
| 0 | hdrLen | | | | | | | |
| 1 | repeat | | | | | | | |
| 2 | LotID | | | | | | | |
| 3 | | | | | | | | |
| 4 | position | | | | | | | |
| 5 | | | | | | | | |
| 6 | | | | | | | | |
| 7 | | | | | | | | |

*FIG. 16*

| BYTE # | Bit Position | | | | | | | |
|---|---|---|---|---|---|---|---|---|
| | MSB | | | | | | | LSB |
| | 7 | 6 | 5 | 4 | 3 | 2 | 1 | 0 |
| | FORMAT | | | | | | | |
| 12 | hour (lsb) | | | minute | | | | |
| 13 | day | | | | hour (msb) | | | |
| 14 | year (lsb) | | | | month | | | |
| 15 | year (msb) | | | | | | | |

*FIG. 18*

SYSTEMS AND METHODS FOR TRANSMITTING AND RECEIVING LARGE OBJECTS VIA DIGITAL RADIO BROADCAST

This application is a divisional of U.S. patent application Ser. No. 12/003,315 filed Dec. 21, 2007, now U.S. Pat. No. 8,595,748, the entire contents of which are incorporated herein by reference.

BACKGROUND

1. Field of the Disclosure

The present disclosure relates to digital radio broadcast transmission and reception and, in particular, to methods and systems for transmitting and receiving large objects via digital radio broadcast.

2. Background Information

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio™ technology is an implementation of the NRSC-5A IBOC standard. Further information regarding HD Radio™ technology can be found at www.hdradio.com and www.ibiquity.com.

Other types of digital radio broadcasting systems include satellite systems such as Satellite Digital Audio Radio Service (SDARS, e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio broadcasting including in-band on-channel broadcasting, as well as other digital terrestrial broadcasting and satellite broadcasting.

Digital radio broadcasting systems have the capability to provide data services to receivers. However, the capability to transmit large data objects has suffered from several problems. For example, conventional techniques of broadcasting large objects may require the receiver to receive a large header before the body of the object may be decoded. Due to the non-deterministic nature of the radio propagation environment, these headers may frequently be corrupted or lost during transmission. This requirement to receive a header before commencing decoding may therefore cause lengthy delays in decoding large objects. The present inventors have observed a need for systems and methods to facilitate the transmission of large data objects via digital radio broadcast that obviate these problems.

SUMMARY

Embodiments of the present disclosure are directed to systems and methods that may satisfy these needs. According to exemplary embodiments, a method of preparing a large object for digital radio broadcast transmission is disclosed. The method comprises retrieving an object and an object description; assigning a unique identifier to the object; segmenting the object into a plurality of fragments; generating at least one long message having selected ones of the fragments and a long header comprising the unique identifier and the object description; generating at least one short message having selected ones of the fragments and a short header comprising the unique identifier; and communicating the at least one long message and the at least one short message to a digital radio broadcast transmitter. A system comprising a processing system and a memory coupled to the processing system are described wherein the processing system is configured to carry out the above-described method. Computer programming instructions adapted to cause a processing system to carry out the above-described method may be embodied within any suitable computer readable medium.

According to exemplary embodiments, a method of assembling a large object from a digital radio broadcast transmission is disclosed. The method comprises receiving a short message having at least one fragment and a short header comprising a unique identifier; partially assembling an object from the at least one fragment of the short message; receiving a long message having at least one fragment and a long header comprising the unique identifier and an object description; and assembling the object from the at least one fragment of the long message and the object description, wherein the object is partially assembled without waiting to receive the object description. A system comprising a processing system and a memory coupled to the processing system are described wherein the processing system is configured to carry out the above-described method. Computer programming instructions adapted to cause a processing system to carry out the above-described method may be embodied within any suitable computer readable medium.

BRIEF DESCRIPTION OF THE DRAWINGS

These and other features, aspects, and advantages of the present disclosure will become better understood with regard to the following description, appended claims, and accompanying drawings wherein:

FIG. 5 is a schematic representation of a hybrid AM IBOC DAB waveform.

FIG. 6 is a schematic representation of an all-digital AM IBOC DAB waveform.

FIG. 15 illustrates a full header in accordance with certain embodiments;

FIG. 16 illustrates a fragment header in accordance with certain embodiments;

FIG. 18 illustrates an exemplary discard time field in accordance with certain embodiments;

DESCRIPTION

The Large Object Transfer (LOT) protocol as described herein can enable transmitters to effectively communicate large data objects to receivers via digital radio broadcast.

Exemplary Digital Radio Broadcasting System

FIGS. 1-10 and the accompanying description herein provide a general description of an exemplary IBOC system, exemplary broadcasting equipment structure and operation, and exemplary receiver structure and operation, including structure and operation for supporting LOT functionality. FIGS. 11-20 and the accompanying description herein provide a detailed description of exemplary approaches for encoding, broadcasting, receiving, and decoding large data objects in accordance with exemplary embodiments of the present disclosure. Whereas aspects of the disclosure are presented in the context of an exemplary IBOC system, it should be understood that the present disclosure is not limited to IBOC systems and that the teachings herein are applicable to other forms of digital radio broadcasting as well.

IBOC digital radio content is generated by a variety of entities including local station programmers, network programmers (e.g., news, sports, concerts), and third-party program syndicators and data service providers. This digital radio content can include a wide variety of data objects such as electronic program guides (EPGs), graphics, traffic downloads, audio programs such as podcasts or audiobooks, navigation maps, multimedia applications, video games, or any other form of data. EPGs for digital radio broadcasting are described in more detail in commonly assigned U.S. Pat. No. 8,983,365 entitled "Systems and Methods for Communicating and Rendering Electronic Program Guide Information via Digital Radio Broadcast Transmission,", which is incorporated herein by reference in its entirety. These data objects may be quite large, for example several megabytes or more in size. Accordingly, exemplary systems and methods for encoding and decoding these large objects are disclosed.

Figure 1:
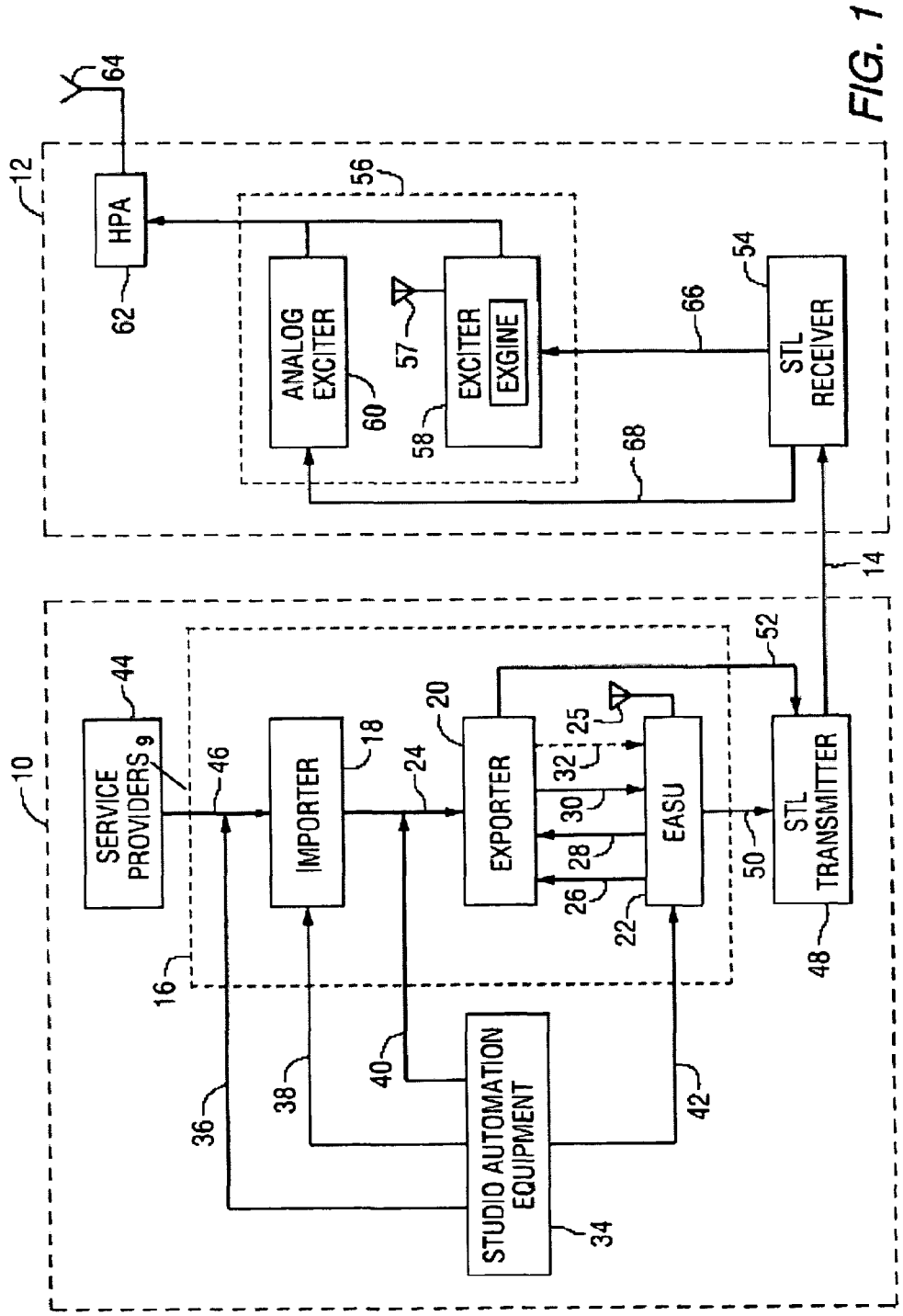
FIG. 1 illustrates a block diagram that provides an overview of a system in accordance with certain embodiments.

Referring to the drawings, FIG. 1 is a functional block diagram of the relevant aspects of a studio site 10, an FM transmitter site 12, and a studio transmitter link (STL) 14 that can be used to broadcast an FM IBOC DAB signal to IBOC radio capable receivers. The studio site 10 includes, among other things, studio automation equipment 34, an importer 18, an exporter 20, an Exciter Auxiliary Service Unit (EASU) 22, and an STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site 10 the studio automation equipment supplies main program service (MPS) audio 42 to the EASU, MPS data (MPSD) 40 to the exporter, supplemental program service (SPS) audio 38 to the importer, and SPS data (SPSD) 36 to the importer. MPS audio serves as the main audio programming source. In hybrid modes, it preserves the existing analog radio programming formats in both the analog and digital transmissions. MPSD, also known as program service data (PSD), includes information such as music title, artist, album name, etc. Supplemental program service can include supplementary audio content as well as PSD.

Second Generation Data Services, known as Advanced Applications Services (AAS), include the ability to deliver many data services or streams and application specific content over one channel in the AM or FM spectrum, and enable stations to broadcast multiple streams on supplemental or sub-channels of the main frequency. A "service" in this context may be defined as content that is delivered to users via digital radio broadcast. AAS contains the HD Radio data payload and shares channel bandwidth with multicasting services to provide broadcast data services. Both streaming and file based data services are supported. AAS can include any type of data that is not classified as MPS, SPS, or Station Information Service (SIS). For example, AAS includes a Service Information Guide (SIG) which provides detailed station service information and includes services besides multicast audio programming, including the EPG (a data service), navigation maps, traffic information, multimedia applications and other data content.

The importer 18 contains hardware and software for supplying AAS. Services are identified in the SIG by their MIME hash and their logical address (described below) in the AAS. The content for AAS can be supplied by the service providers 44, which provide service data 46 to the importer via an API. The service providers may be a broadcaster located at the studio site or externally sourced third-party providers of services and content. The importer 18 can establish session connections between multiple service providers. The importer 18 encodes and multiplexes service data 46, SPS audio 38, and SPS data 36 to produce exporter link data 24, which is output to the exporter 20 via a data link 24. Station Information Service (SIS) is also provided, which comprises station information such as call sign, absolute time, position correlated to GPS, data describing the services available on the station (e.g., a subset of the MIME hash transmitted in the SIG such as the least significant 12-bits), etc.

The importer 18 can use a data transport mechanism, which may be referred to herein as a radio link subsystem (RLS), to provide packet encapsulation, varying levels of quality of service (e.g., varying degrees of forward error correction and interleaving), and bandwidth management functions. The RLS can utilize High-Level Data Link Control (HDLC) for encapsulating the packets. HDLC is known to one of skill in the art and is described in ISO/IEC 13239:2002 Information technology—Telecommunications and information exchange between systems—High-level data link control (HDLC) procedures. HDLC framing includes a beginning frame delimiter (e.g., '0x7E'), a logical address (e.g., port number), a control field for sequence numbers and other information (e.g., packet 1 of 2, 2 of 2 etc.), the payload (e.g., the index file), a checksum (e.g., a CRC), and an ending frame delimiter (e.g., '0x7E'). For bandwidth management, the importer 18 typically assigns logical addresses (e.g. ports) to AAS data based on, for example, the number and type of services being configured at any given studio site 10. RLS is described in more detail in U.S. Pat. No. 7,305,043, which is incorporated herein by reference in its entirety.

Due to receiver implementation choices, the RLS packet can be limited in size to about 8192 bytes, for example, but other sizes could also be used. Therefore data may be prepared for transmission in a packet mode for transmitting objects larger than the maximum packet size. In packet mode the importer 18 may include a large object transfer (LOT) client (e.g. a software client that executes on the same computer processing system as the importer 18) to segment a large object (for example, a sizeable EPG file) into fragments no larger than the chosen RLS packet size. In typical embodiments objects may range in size up to 4,294,967,295 bytes.

The LOT client retrieves objects from memory locations such as database entries, entries in a file system, or any other suitable storage location; segments the objects; and then writes packets to an RLS port for broadcast to the receiver. At the receiver, the LOT client reads packets from the RLS port of the same number. The LOT client may process data associated with many RLS ports (e.g., typically up to 32) simultaneously, both at the receiver and the transmitter. The LOT client may transmit RLS packets such that each LOT fragment is 256 bytes, in which case the bandwidth allocation can be 1.3 Kbps if the LOT object is being transmitted over P1 channel and 10 Kbps if the LOT object is being transmitted over P3 channel, for example.

The LOT client operates by sending a large object in several messages, each of which is no longer than the maximum packet size. To accomplish this, the LOT client assigns an integer called a LotID to each object broadcast via the LOT protocol. Any suitable range of LotID can be used such as 0 to 65536. All messages for the same object will use the same LotID. The choice of LotID is arbitrary except that no two objects being broadcast concurrently on the same RLS port may have the same LotID. In some implementations, it may be advantageous to exhaust all possible LotID values before a value is reused.

Figure 11A:
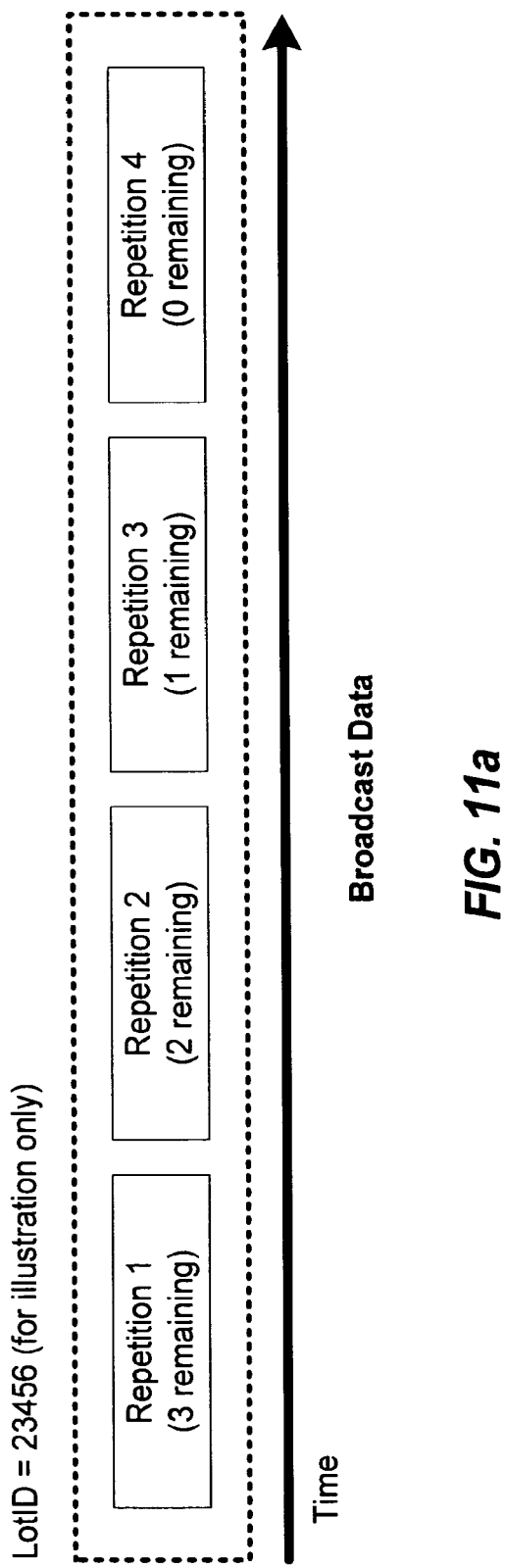
FIGS. 11a and 11b illustrate an exemplary transmission pattern of object segments in accordance with certain embodiments.
Figure 11B:
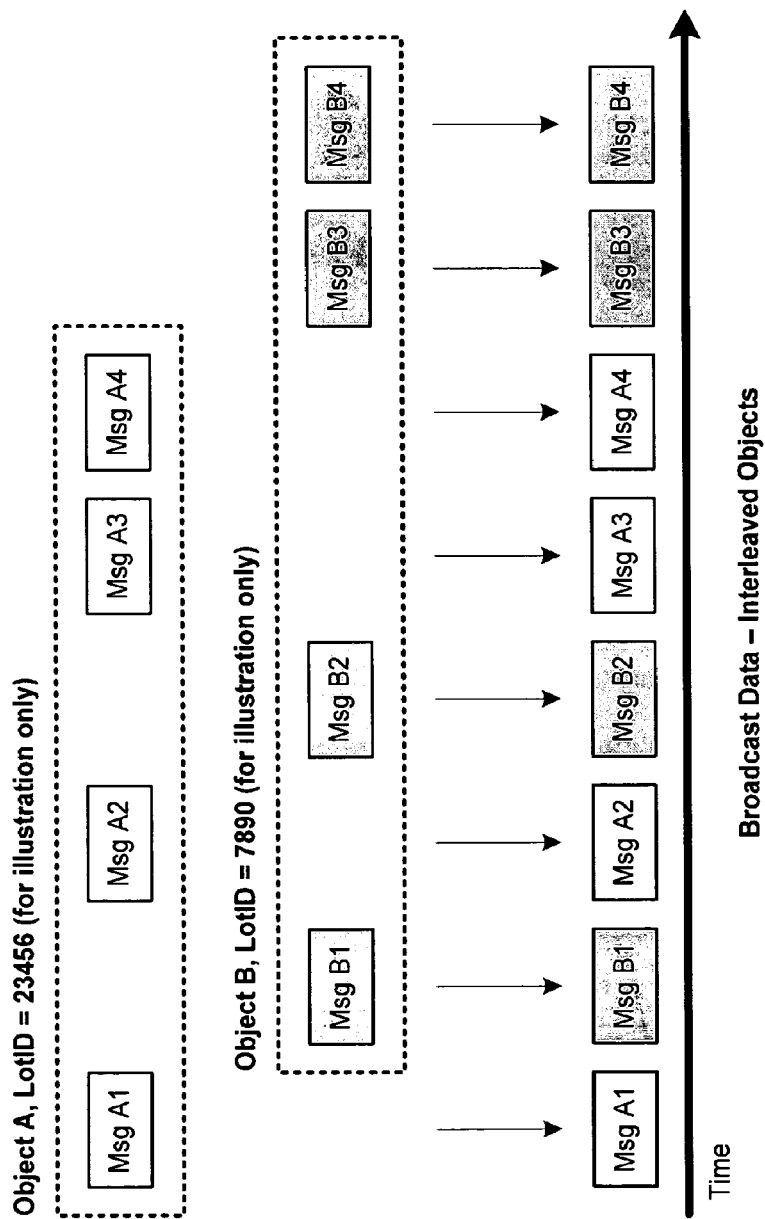

When transmitting data over-the-air, there may be some packet loss due to the probabilistic nature of the radio propagation environment. The LOT client addresses this issue by allowing the transmitter to repeat the transmission of an entire object, which may increase the probability of successful receipt. Once an object has been received correctly, the receiver can ignore any remaining repetitions. All repetitions will use the same LotID. An exemplary repetition pattern is shown in FIG. 11*a*. As shown, the exemplary object assigned LotID 23456 is transmitted four times. Additionally, the transmitter may interleave messages for different objects on the same RLS port so long as each object on the port has been assigned a unique LotID. For example, as shown in FIG. 11*b*, object A has been divided into messages A1, A2, A3, and A4, and object B has been divided into messages B1, B2, B3, and B4. The messages for object A are interleaved with the messages for object B in the following pattern: A1; B1; A2; B2; A3; A4; B3; and then B4. This interleaving may be performed with an arbitrary number of different objects and the order of interleaving may be based on a number of factors including the priority of messages, age of messages, bandwidth requirements, etc. To perform this task, the transmit LOT client may operate according to an efficient scheduling algorithm. The scheduling algorithm may be statistical in nature, for example, and may use one or more of the following metrics to maintain proper broadcasting ratios between the various objects to be transmitted on the same RLS port: 1) bandwidth allocated to the service; 2) object repetition requirements; and 3) relative bandwidth error among the objects.

Input into the scheduling algorithm can be a specification of the percentage of the available bandwidth that should be allocated to each object to be transmitted. During the transmission of fragments of objects, the algorithm tracks the amount of bandwidth used to transmit the fragments of objects being transmitted. When the importer requests data, the algorithm selects new fragments from the objects with the largest bandwidth errors (i.e., those which have actually received the least of their allocated bandwidth). For example, if ten objects are to be transmitted and there is sufficient bandwidth to transmit only three fragments per PDU, the algorithm can select three of the ten objects, for example, to each receive ⅓ of the allocated bandwidth initially (wherein each object is actually allocated 1/10 of the total bandwidth).

Upon the next PDU request from the importer, the algorithm will then select new fragments for transmission from those objects that did not actually receive any bandwidth allocation initially. The algorithm tracks the actual bandwidth allocation for each PDU request, updates its statistics to identify fragments for the next PDU request accordingly, and selects new fragments for transmission based on that assessment. In making this ongoing assessment, the algorithm may compute the relative bandwidth error, i.e., the difference between allocated bandwidth and the actual bandwidth used for each object accumulated over the various PDU requests, as follows:

$$\varepsilon = \frac{P_D - P_M}{P_D}$$

where $P_D$=the desired percentage of bandwidth allocated for a given object and $P_M$=the measured percentage of bandwidth actually used for that object. Once an object repetition requirement is met, its allocated percentage of bandwidth may be distributed equally among the remaining objects.

Figure 12:
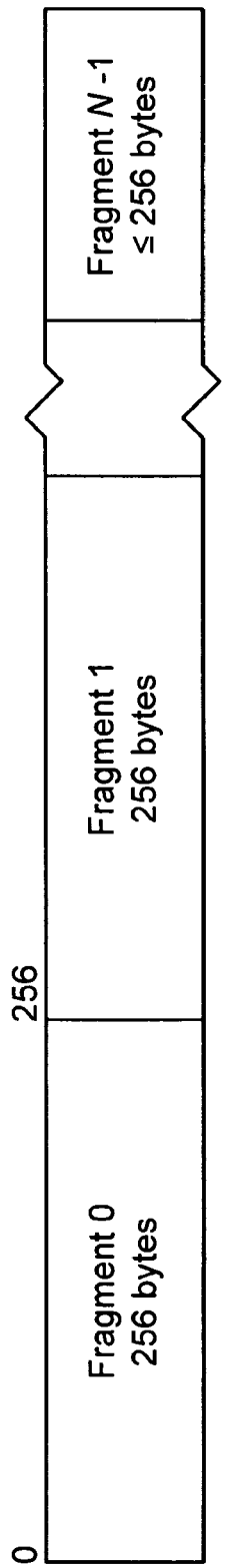
FIG. 12 illustrates exemplary object fragments in accordance with certain embodiments.

The LOT client divides a large object into messages, which are further subdivided into fragments as shown in FIG. 12. Preferably all the fragments in a message, excepting the last fragment, are a fixed length such as 256 bytes, although any suitable length may be used. The last fragment may be any length that is less than the fixed length (e.g., less than 256 bytes). Fragments are numbered consecutively starting from zero. However, in some embodiments an object may have a zero-length object—the messages would contain only descriptive information about the object.

Figure 13:
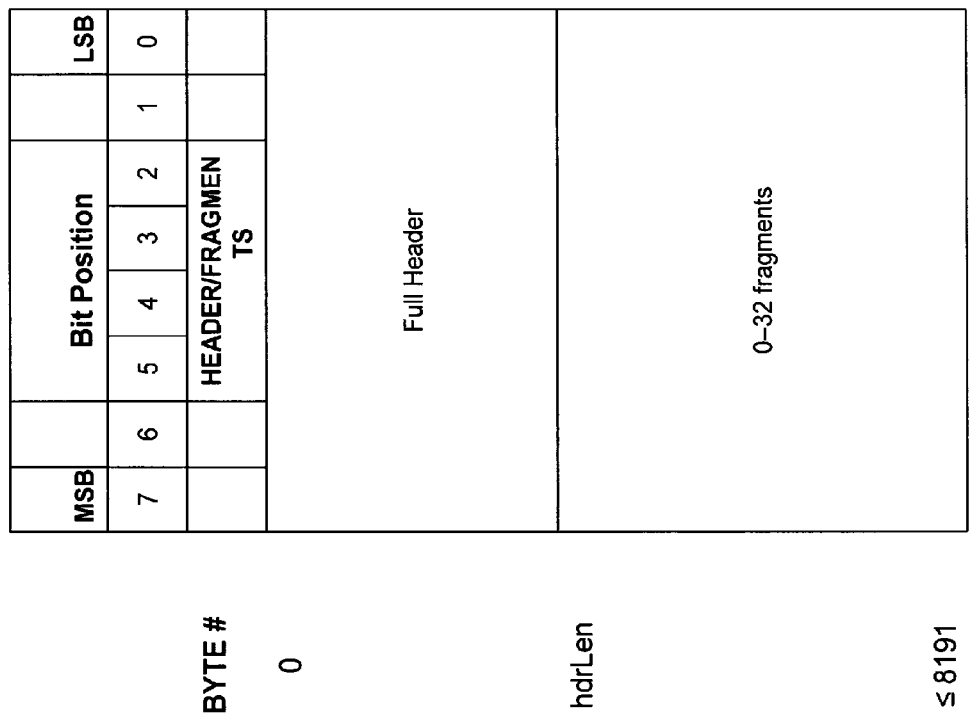
FIG. 13 illustrates a full header message in accordance with certain embodiments.
Figure 14:
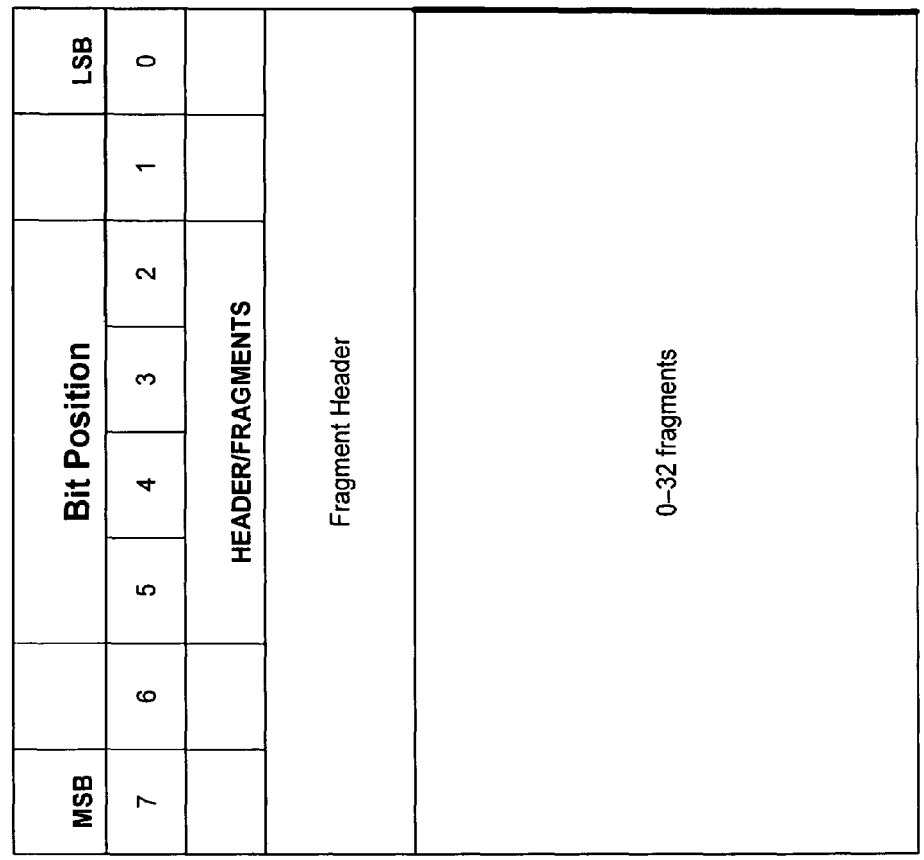
FIG. 14 illustrates a fragment header message in accordance with certain embodiments.

The LOT client typically uses two types of messages—a full header message (also referred to herein as a long message) as illustrated in FIG. 13, and a fragment header message (also referred to herein as a short message) as illustrated in FIG. 14. Each message includes a header followed by fragments of the object. The long header (i.e. the header of the long message) contains the information to reassemble the object from the fragments plus descriptive information about the object. By comparison, the short header (i.e. the header of the short message) contains only reassembly information. The LOT client in a receiver (e.g. a software and/or hardware application that typically executes within the data processors 232 and 288 of FIGS. 7 and 8 respectively or any other suitable processing system) distinguishes between the two types of messages by a header-length field (e.g. field name "hdrLen"). Advantageously, by including the short header in the short message, the receiver may begin to assemble the object based on the LotID without having received the object description from the full header. Each message can contain any suitable number of fragments of the object identified by the LotID in the header as long as the maximum RLS packet length is not exceeded. There is no requirement that all messages for an object contain the same number of fragments. Table 1 below illustrates exemplary field names and their corresponding descriptions for a long header. An exemplary long header is shown in FIG. 15. Short headers typically include only the hdrLen, repeat, LotID, and position fields described in Table 1. An exemplary short header is shown in FIG. 16.

TABLE 1

| FIELD NAME | FIELD DESCRIPTION |
|---|---|
| hdrLen | Size of the header in bytes, including the hdrLen field. Typically ranges from 24-255 bytes. |
| Repeat | Number of object repetitions remaining. All messages for the same repetition of the object use the same repeat value. When repeating an object, the transmitter broadcasts all messages having repeat = R before broadcasting any messages having repeat = R-1. A value of 0 typically means the object will not be repeated again. |
| LotID | Arbitrary identifier assigned by the transmitter to the object. Typically range from 0 to 65,535. All messages for the same object use the same LotID value. |
| position | The byte offset in the reassembled object of the first fragment in the message equals 256*position. |
| Version | Version of the LOT protocol |
| discardTime | Year, month, day, hour, and minute after which the object may be discarded at the receiver. |
| fileSize | Total size of the object in bytes. |
| mimeHash | MIME hash describing the type of object |
| fileName | File name associated with the object |

Figure 17:
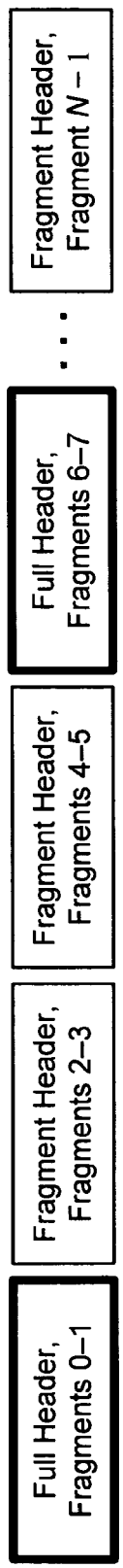
FIG. 17 illustrates an exemplary header repetition pattern in accordance with certain embodiments.

Long messages and short messages may be sent in any ratio provided that at least one long message is broadcast for each object. Bandwidth efficiency will typically be increased by minimizing the number of long messages; however, this may increase the time necessary for the receiver to determine whether an object is of interest based on the descriptive information that is only present in the long header. Therefore there is typically a trade between efficient use of broadcast bandwidth and efficient receiver processing and reception of desired LOT files. An exemplary transmission ratio is shown in FIG. 17 wherein the long message is sent every third message.

In some embodiments long headers and short headers contain a repeat field R specifying the number of times the associated object will re-transmitted. Typically, this field will decrement each time the object is transmitted until it reaches zero, at which point the object will cease to be retransmitted. Suitable values for this field may be from 0 to 255, although any suitable numbers may be used. In typical implementations, all messages for the same repetition of the object use the same repeat value. When repeating an object, the transmitter may broadcast all messages having repeat=R before broadcasting any messages having repeat=R-1. Referring back to the example shown in FIG. 11, R=3 for the first transmission of the object with LotID=23456, R=2 for the second transmission, R=1 for the third transmission, and R=0 for the fourth and final transmission. The updating of the repeat field is typically controlled by a LOT client in the transmitter.

The long headers and short headers typically include a position field that describes the position of the first fragment in the associated message. This may describe a byte offset in the reassembled object of the first fragment in the message equals 256*position (assuming that each fragment is a fixed length of 256 bytes). For example, referring to FIG. 17, the position of the first fragment of the first long message is position=0, the position of the first fragment of the first short message is position=2, the position of the first fragment of the second short message is position=4, and the position of the first fragment of the second long message is position=6. The position may also be referred to herein as the fragment number.

Long headers also may include version, fileSize, mimeHash, and fileName fields. In some embodiments long headers include a version field that describes the version number of the current LOT protocol. This version number may be incremented whenever the LOT protocol is updated. Long headers also include a fileSize field that describes the total size of the object in bytes. In some embodiments long headers include a mimeHash field that contains a hash of the Multipurpose Internet Mail Extensions (MIME) description of the associated object. MIME descriptions and suitable hash techniques for MIME descriptions would be known to one of skill in the art. In some embodiments long headers include a fileName field that may be a character string identifying the associated object. The fileName field may contain, for example, a short description and a path name useable by the receiver's file system.

In some embodiments long headers contain a discardTime field that specifies the time and date after which the object may be discarded by the receiver. This may be advantageous, for example, to prevent filling the receiver's object buffer with outdated objects. An exemplary encoding format for the discardTime field is illustrated in FIG. 18. As shown, the discardTime field contains the year, month, day, hour and minute expressed in Coordinated Universal Time (UTC) at which the receiver may discard the associated object. Exemplary values for the discardTime field are illustrated in Table 2 below.

TABLE 2

| NAME | DESCRIPTION |
| --- | --- |
| Minute | Minute (0-59) |
| Hour | Hour (0-23) |
| | Byte 12 contains the least-significant two bits |
| | Byte 13 contains the most-significant three bits |
| Day | Day (1-31) |
| Month | Month (1-12) |
| Year | Year (0-4095) |
| | Byte 14 contains the least-significant four bits |
| | Byte 15 contains the most-significant eight bits |

The exporter 20 contains the hardware and software necessary to supply the MPS and SIS for broadcasting. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol (UDP/IP) or the standard TCP/IP.

The transmitter site 12 includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the entire disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
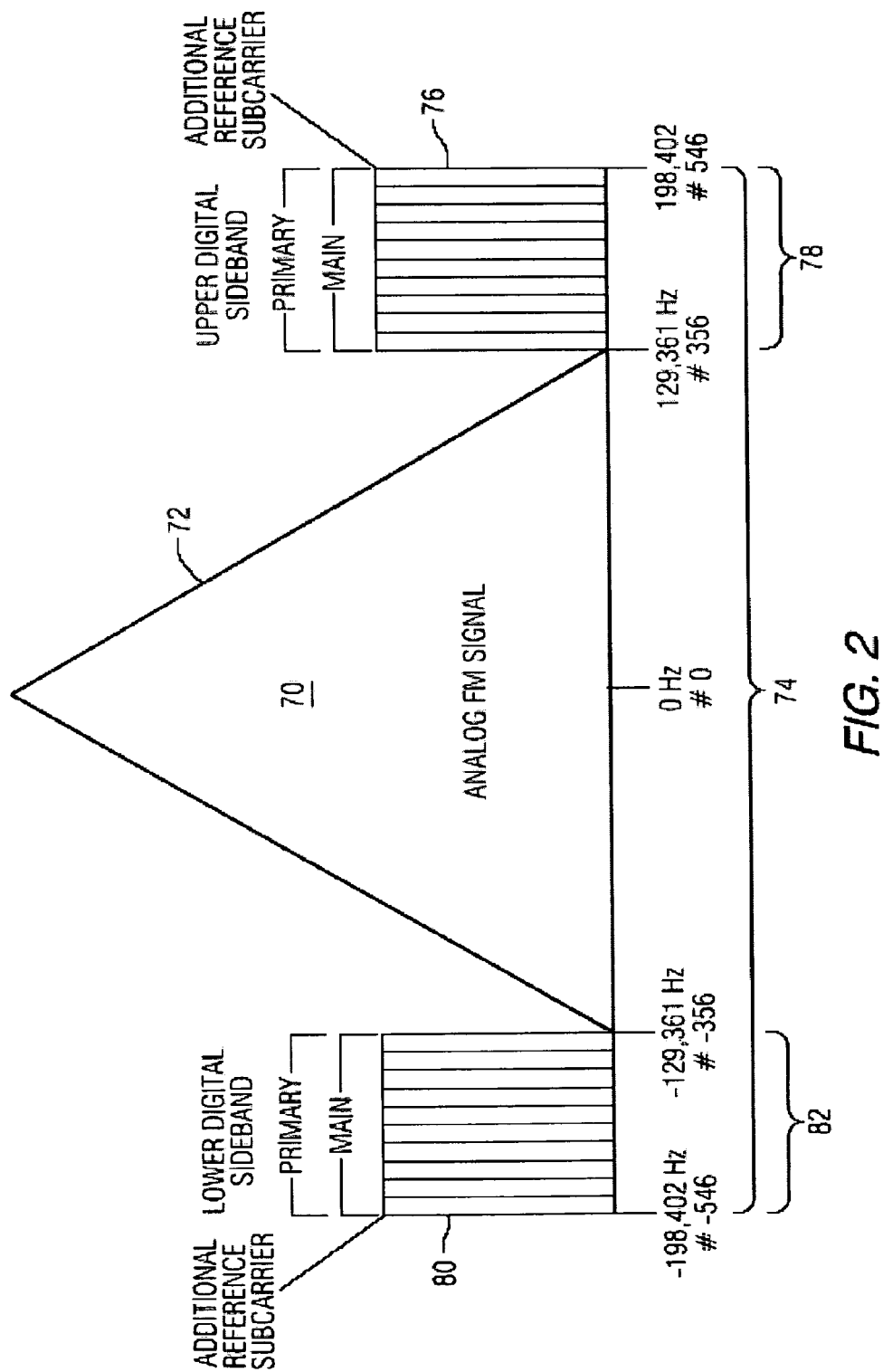
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 orthogonal frequency division multiplexing (OFDM) subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
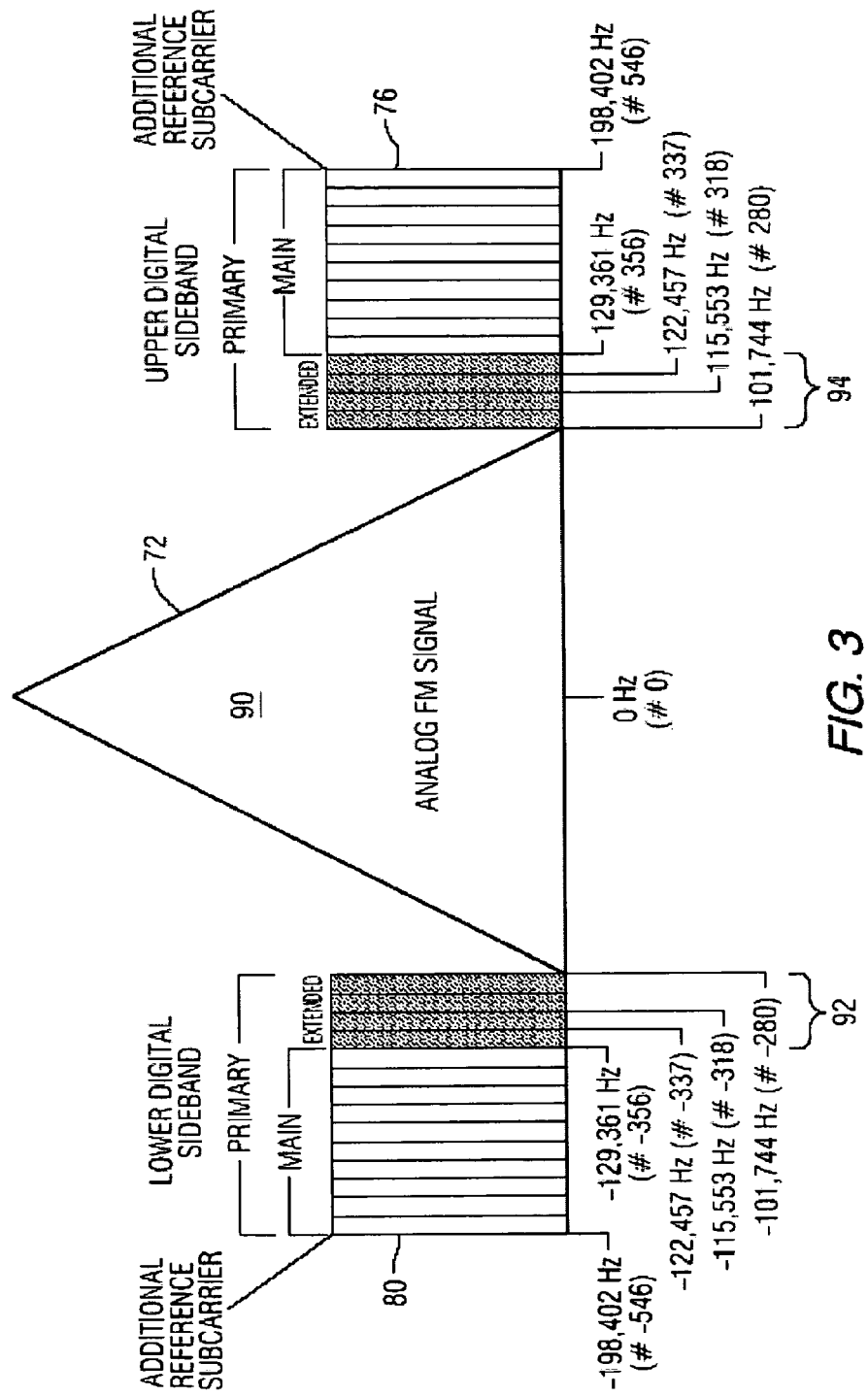
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
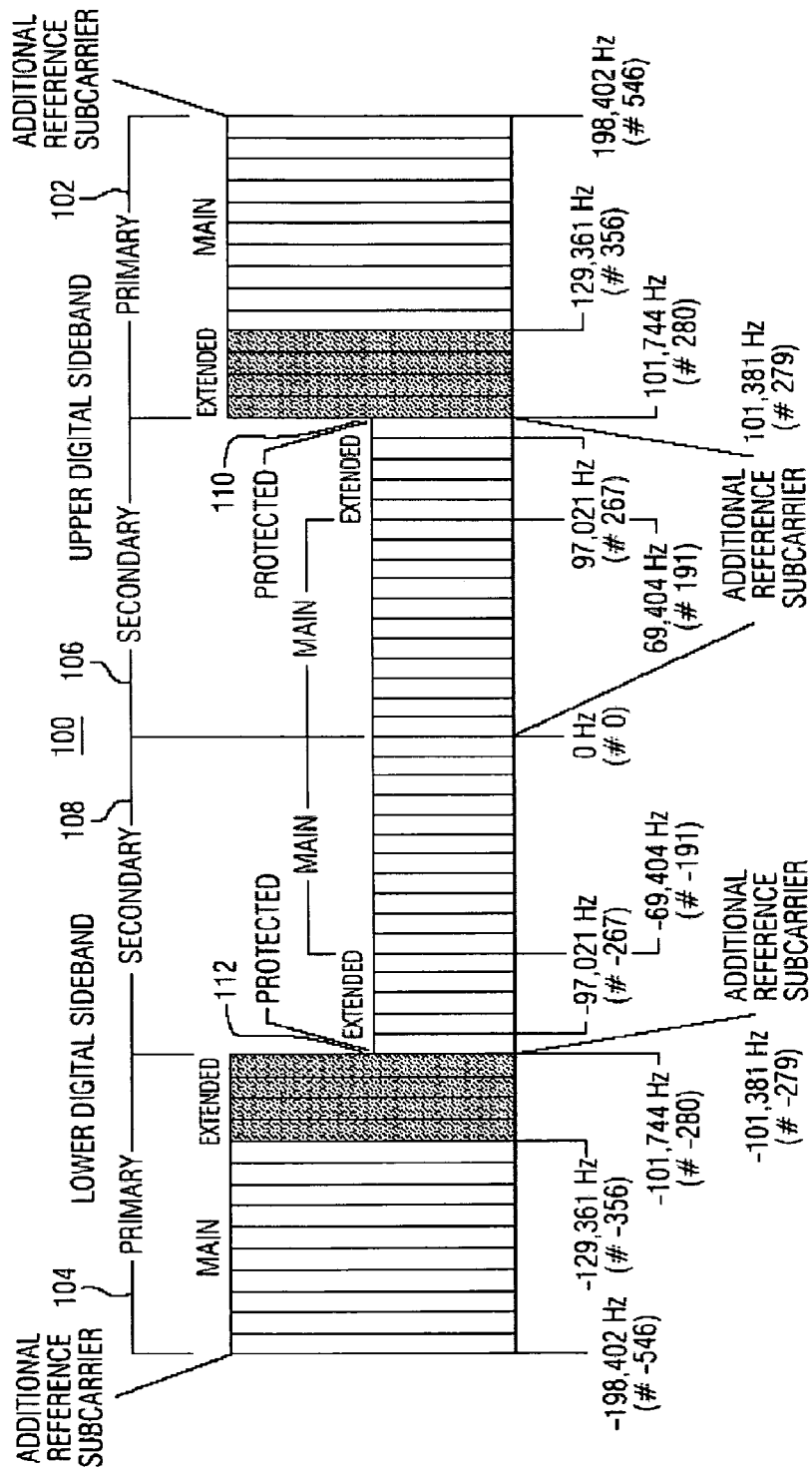
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
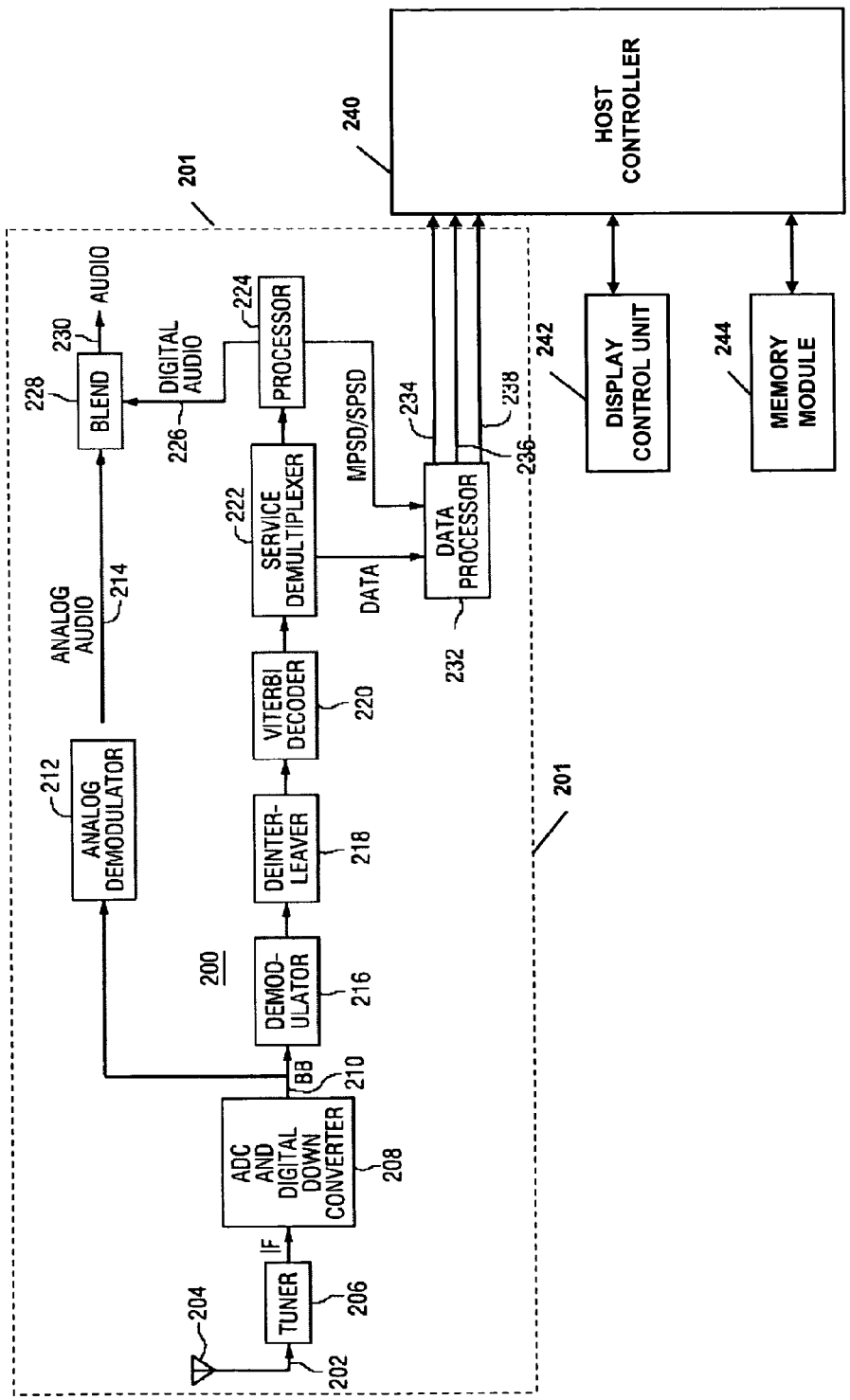
FIG. 7 is a functional block diagram of an AM IBOC DAB receiver in accordance with certain embodiments.

FIG. 7 is a simplified functional block diagram of the relevant components of an AM IBOC DAB receiver 200. The receiver includes a signal processing block 201, a host controller 240, a display controller unit (DCU) 242, and a memory module 244. The signal processing block 201 includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demultiplexer 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data lines 234, 236, and 238 may be multiplexed together onto a suitable bus such as an Inter-Integrated Circuit (I²C) or Serial Peripheral Interface (SPI) bus. The data signals can include, for example, SIS, MPS data, SPS data, and one or more AAS.

The host controller 240 receives and processes the data signals (e.g., the SIS, MPSD, SPSD, and AAS signals) from the signal processing block 201. The host controller comprises a microcontroller that is coupled to the DCU 242 and memory module 244. Any suitable microcontroller could be used such as an Atmel® AVR 8-bit reduced instruction set computer (RISC) microcontroller, an advanced RISC machine (ARM®) 32-bit microcontroller or any other suitable microcontroller. The DCU 242 comprises any suitable I/O processor that controls the display, which may be any suitable visual display such as an LCD or LED display. In certain embodiments, the DCU 242 may also control user input components via a keyboard, touch-screen display, dials, knobs or other suitable inputs. The memory module 244 may include any suitable data storage medium such as RAM, Flash ROM (e.g., an SD memory card), and/or a hard disk drive.

Figure 8:
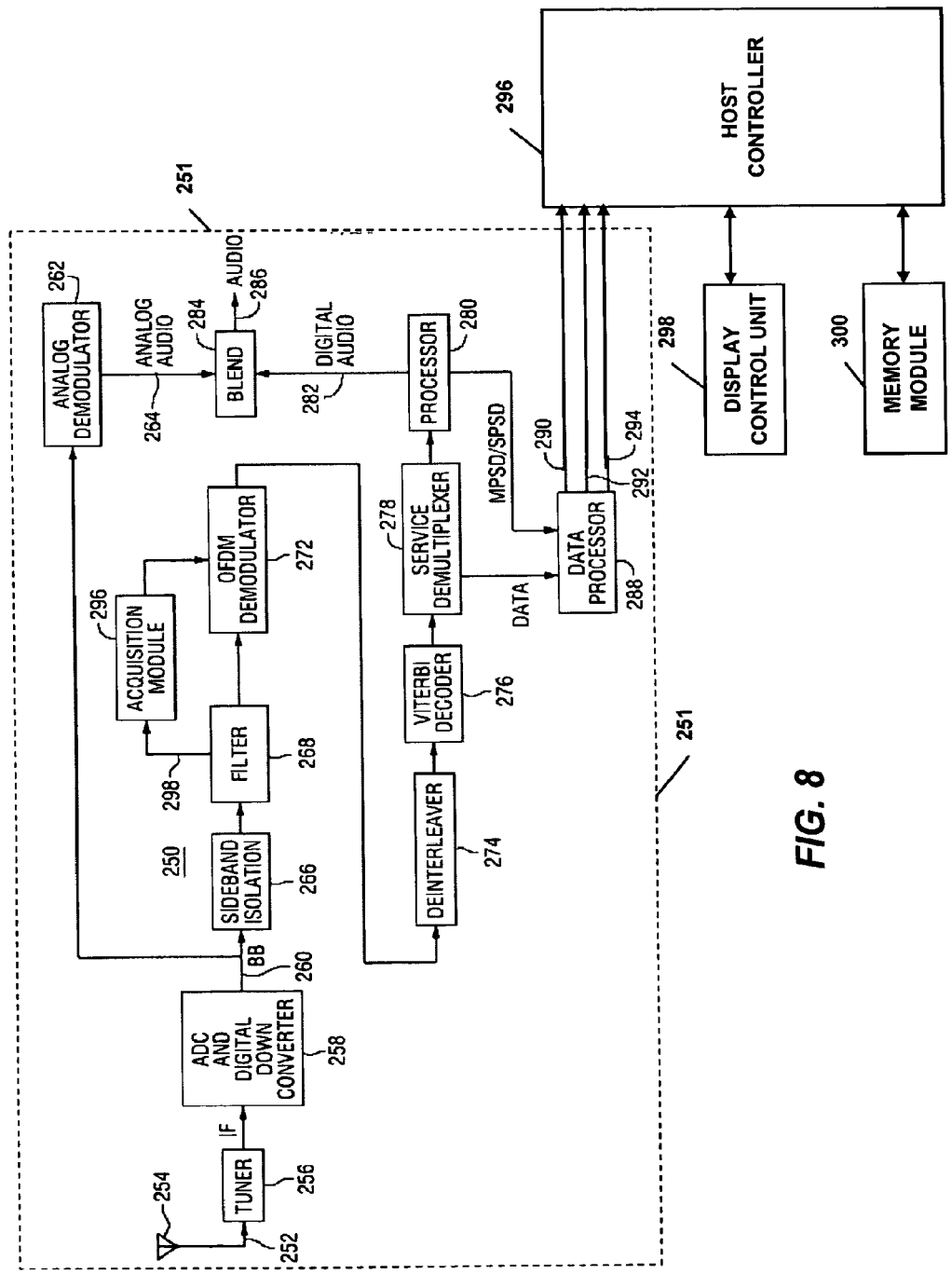
FIG. 8 is a functional block diagram of an FM IBOC DAB receiver in accordance with certain embodiments.

FIG. 8 is a simplified functional block diagram of the relevant components of an FM IBOC DAB receiver 250. The receiver includes a signal processing block 251, a host controller 296, a DCU 298, and a memory module 300. The signal processing block 251 includes an input 252 connected to an antenna 254 and a tuner or front end 256. A received signal is provided to an analog-to-digital converter and digital down converter 258 to produce a baseband signal at output 260 comprising a series of complex signal samples. The signal samples are complex in that each sample comprises a "real" component and an "imaginary" component, which is sampled in quadrature to the real component. An analog demodulator 262 demodulates the analog modulated portion of the baseband signal to produce an analog audio signal on line 264. The digitally modulated portion of the sampled baseband signal is next filtered by sideband isolation filter 266, which has a pass-band frequency response comprising the collective set of subcarriers $f_1$-$f_n$ present in the received OFDM signal. Filter 268 suppresses the effects of a first-adjacent interferer. Complex signal 298 is routed to the input of acquisition module 296, which acquires or recovers OFDM symbol timing offset or error and carrier frequency offset or error from the received OFDM symbols as represented in received complex signal 298. Acquisition module 296 develops a symbol timing offset Δt and carrier frequency offset Δf, as well as status and control information. The signal is then demodulated (block 272) to demodulate the digitally modulated portion of the baseband signal. Then the digital signal is deinterleaved by a deinterleaver 274, and decoded by a Viterbi decoder 276. A service demultiplexer 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data lines 290, 292 and 294 may be multiplexed together onto a suitable bus such as an I²C or SPI bus. The data signals can include, for example, SIS, MPS data, SPS data, and one or more AAS.

The host controller 296 receives and processes the data signals (e.g., SIS, MPS data, SPS data, and AAS) from the signal processing block 251. The host controller comprises a microcontroller that is coupled to the DCU 298 and memory module 300. Any suitable microcontroller could be used such as an Atmel® AVR 8-bit RISC microcontroller, an advanced RISC machine (ARM®) 32-bit microcontroller or any other suitable microcontroller. The DCU 298 comprises any suitable I/O processor that controls the display, which may be any suitable visual display such as an LCD or LED display. In certain embodiments, the DCU 298 may also control user input components via a keyboard, touch-screen display, dials, knobs or other suitable inputs. The memory module 300 may include any suitable data storage medium such as RAM, Flash ROM (e.g., an SD memory card), and/or a hard disk drive.

In practice, many of the signal processing functions shown in the receivers of FIGS. 7 and 8 can be implemented using one or more integrated circuits. For example, while in FIGS. 7 and 8 the signal processing block, host controller, DCU, and memory module are shown as separate components, the functions of two or more of these components could be combined in a single processor (e.g., a System on a Chip (SoC)).

On power-up, the host controller 240, 296 (shown in FIGS. 7 and 8 respectively) begins to repeatedly request various types of data (e.g., SIS, SIG, and LOT messages or objects) from the signal processing block 201, 251. While the receiver 200, 250 is tuned to a particular radio station, the signal processing block 250, 251 is continuously receiving and buffering RLS packets that are broadcast from the radio station.

The receiver-side LOT client may be implemented in the signal processing block 201, 251, in the host controller 240, 296, or in any suitable combination thereof. The LOT client begins reassembling packets into objects by first retrieving messages from the buffer (e.g. a First-In-First-Out (FIFO) queue or a Last-In-First-Out (LIFO) stack). The header of each message is then parsed to determine whether the message is a long message or a short message. This can be determined based on, for example, the hdrLen field described above.

Advantageously, object reassembly can begin with either a long message or a short message. If the retrieved message is a long message, the object is associated with the appropriate file name, file size, MIME type, etc. contained in the long header, and the fragments are stored in an appropriate memory structure based on the specified position of the first fragment. For example, in some embodiments the fragments may be stored in an array M of length N (M[N]). If the first fragment of the message is fragment number 0 (as specified in the position field), then the first byte of the first fragment would be stored at the beginning of the array at M[0] and the remainder of the bytes would be stored successively at M[1] to M[255]. The first byte of each successive fragment in the message would be stored at M[Fragment Number*256] (again assuming a 256 byte fragment length). If the retrieved message is a short message, the fragments of the message are stored at the appropriate locations in the memory structure. For example, the first byte of the first fragment of the short message would be stored at M[Fragment Number*256] and the remainder of the bytes would be stored successively at M[Fragment Number*256+1] to M[Fragment Number*256+255].

Once the receiver receives a long header describing the file size it can determine whether it has fully assembled the object by comparing the number of fragments received against the total file size. Advantageously, the LOT client may begin assembling the object as soon as a short message is received without having received a long header or any object descriptive information. This may provide faster assembly of objects and greater accuracy, for example, in cases in which the receiver receives short messages first, and only later receives a long message. Once the objects are assembled, they may then be passed to the host controller 240, 296, or an application executing on the host controller responsive to a request (e.g. a polling event).

Figure 9A:
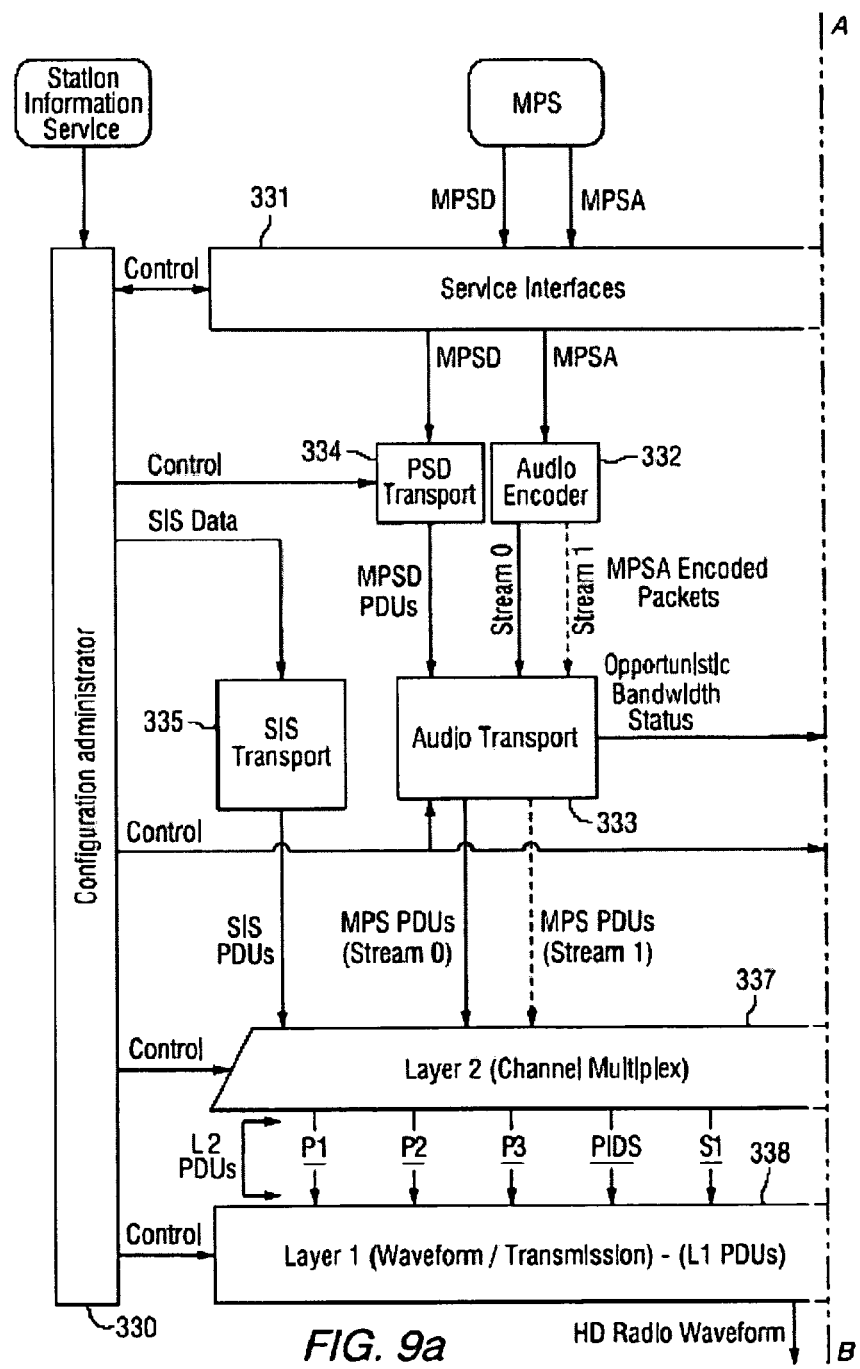
FIGS. 9a and 9b are diagrams of an IBOC DAB logical protocol stack from the broadcast perspective.
Figure 9B:
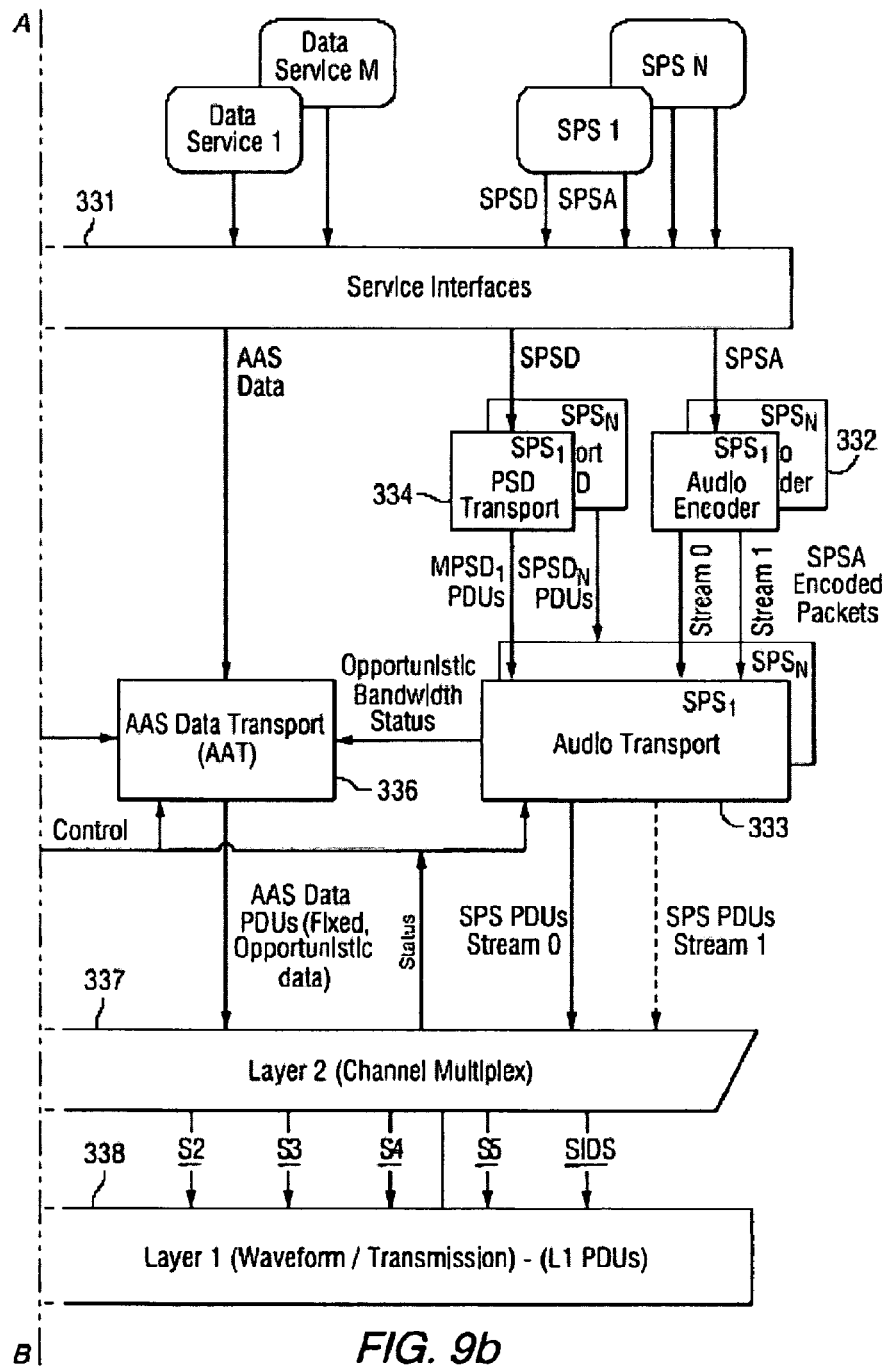

FIGS. 9a and 9b are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9a and 9b, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services. The service interface may be different for each of the various types of services. For example, for MPS audio and SPS audio, the service interface may be an audio card. For MPS data and SPS data the interfaces may be in the form of different APIs. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by PSD transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, indications regarding provided audio and data services, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
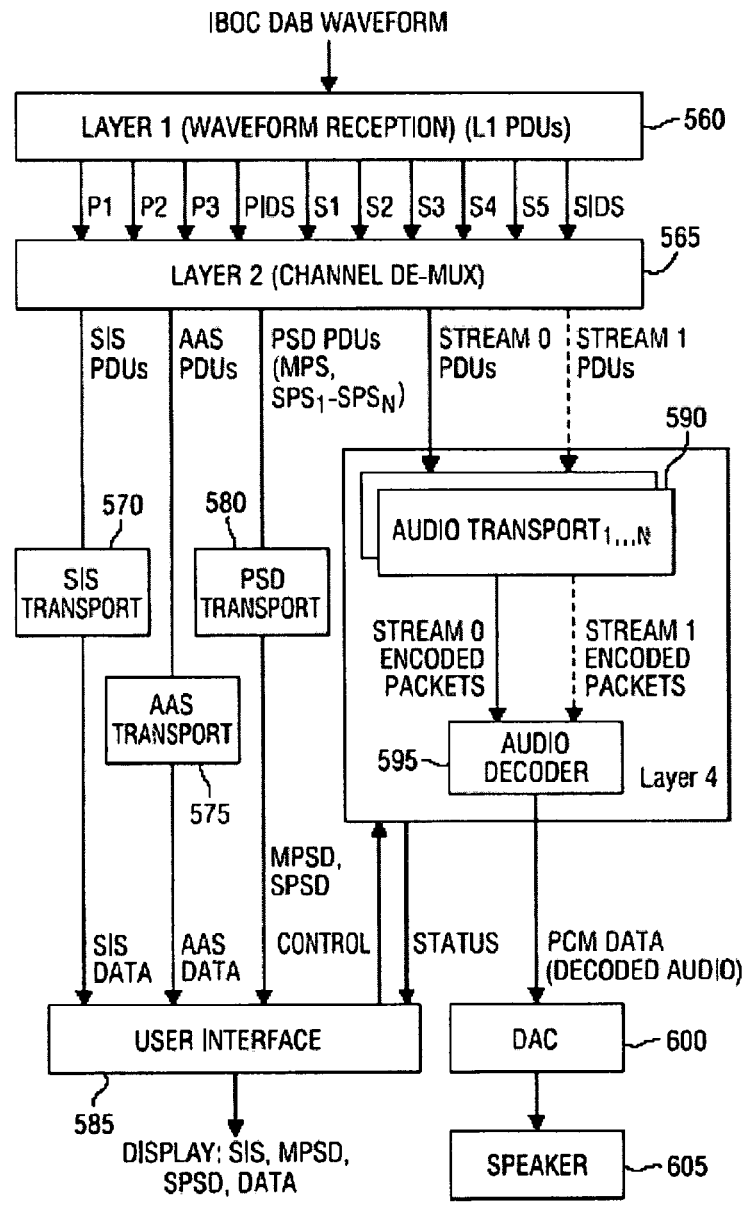
FIG. 10 is a diagram of an IBOC DAB logical protocol stack from the receiver perspective.

FIG. 10 shows the logical protocol stack from the receiver perspective. An IBOC waveform is received by the physical layer, Layer 1 (560), which demodulates the signal and processes it to separate the signal into logical channels. The number and kind of logical channels will depend on the service mode, and may include logical channels P1-P3, Primary IBOC Data Service Logical Channel (PIDS), S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS transport 570 to produce SIS data, the AAS PDUs are processed by the AAS transport 575 to produce AAS data, and the PSD PDUs are processed by the PSD transport 580 to produce MPS data (MPSD) and any SPS data (SPSD). The SIS data, AAS data, MPSD and SPSD are then sent to a user interface 590. The SIS data, if requested by a user, can then be displayed. Likewise, MPSD, SPSD, and any text based or graphical AAS data can be displayed. The Stream 0 and Stream 1 PDUs are processed by Layer 4, comprised of audio transport 590 and audio decoder 595. There may be up to N audio transports corresponding to the number of programs received on the IBOC waveform. Each audio transport produces encoded MPS packets or SPS packets, corresponding to each of the received programs. Layer 4 receives control information from the user interface, including commands such as to store or play programs, and to seek or scan for radio stations broadcasting an all-digital or hybrid IBOC signal. Layer 4 also provides status information to the user interface.

Figure 19:
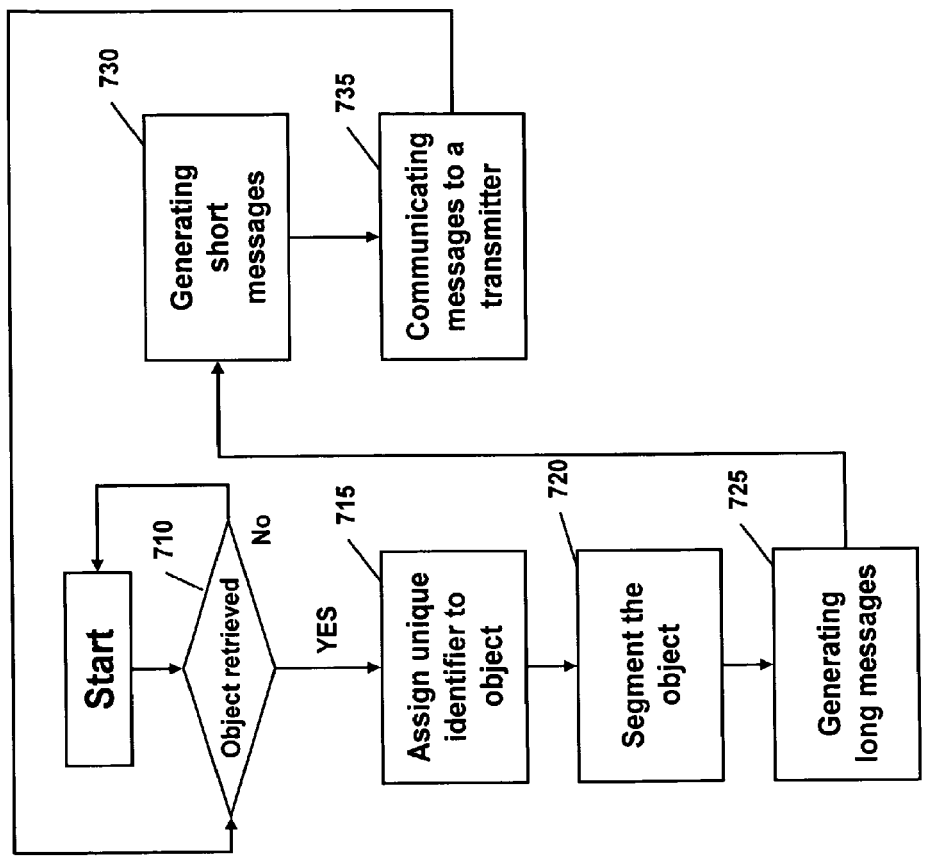
FIG. 19 illustrates an exemplary process of preparing a large object for digital radio broadcast transmission in accordance with certain embodiments.

FIG. 19 illustrates an exemplary process for preparing a large object for digital radio broadcast transmission. Initially, the transmitter LOT client retrieves an object and an object description from a memory location in step 710. The object may be any type of data object such as electronic program guides (EPGs), graphics, traffic downloads, audio programs such as podcasts or audiobooks, navigation maps, multimedia applications, video games, or any other form of data. The object description includes a number of fields describing the object such as a fileName, mimeHash, fileSize, and discardTime as described above. The memory location may be any suitable storage such as database entries, entries in a file system, or any other suitable storage location in the importer 18, in the studio site 10, or in any other suitable location.

In step 715, the transmitter LOT client assigns a unique identifier to the object, also referred to herein as a LotID. The transmitter LOT client segments the object into a plurality of fragments in step 720. Preferably each fragment, except the last fragment, is a fixed length such as 256 bytes. For example, a 2024 byte message could be segmented into 8 fragments with the first 7 being 256 bytes and the last being 232 bytes. The transmitter LOT client then generates at least one long message in step 725. Each long message has a number of fragments and a long header. The number of fragments in each long message may be any suitable number such as 0 to 32 fragments. The long header includes the LotID, object description, and typically hdrLen, repeat (i.e. a repetition counter), and position fields as shown in FIG. 15. The position field describes the relative position of the first fragment of the long message. The transmitter LOT client also generates at least one short message in step 730. Each short message has a number of fragments and a short header. The number of fragments in the short message may be any suitable number such as 0 to 32 fragments. The short header includes the LotID, and typically hdrLen, repeat, and position fields as shown in FIG. 16. The position field describes the relative position of the first fragment of the short message. Finally, in step 735 the transmitter LOT client communicates the long messages and the short messages to the transmitter for digital radio broadcast. In some embodiments, more short messages than long messages are generated. This may be advantageous in minimizing the overhead associated with long headers. In some embodiments, more long messages than short messages are generated. This may be advantageous in increasing receiver efficiency of receiving and successfully processing objects. In any given implementation, there is typically a trade-off between bandwidth efficiency and receiver processing efficiency that may be optimized based on the particular application.

In some embodiments the plurality of fragments (i.e. the segmented object) is repeatedly transmitted based on the repetition counter. For each transmission of the object, the repetition counter may be decremented. The messages for any given object may be interleaved with the messages for another object or objects. Also, in some embodiments, the plurality of fragments is discarded by the transmitter at the discardTime.

Figure 20:
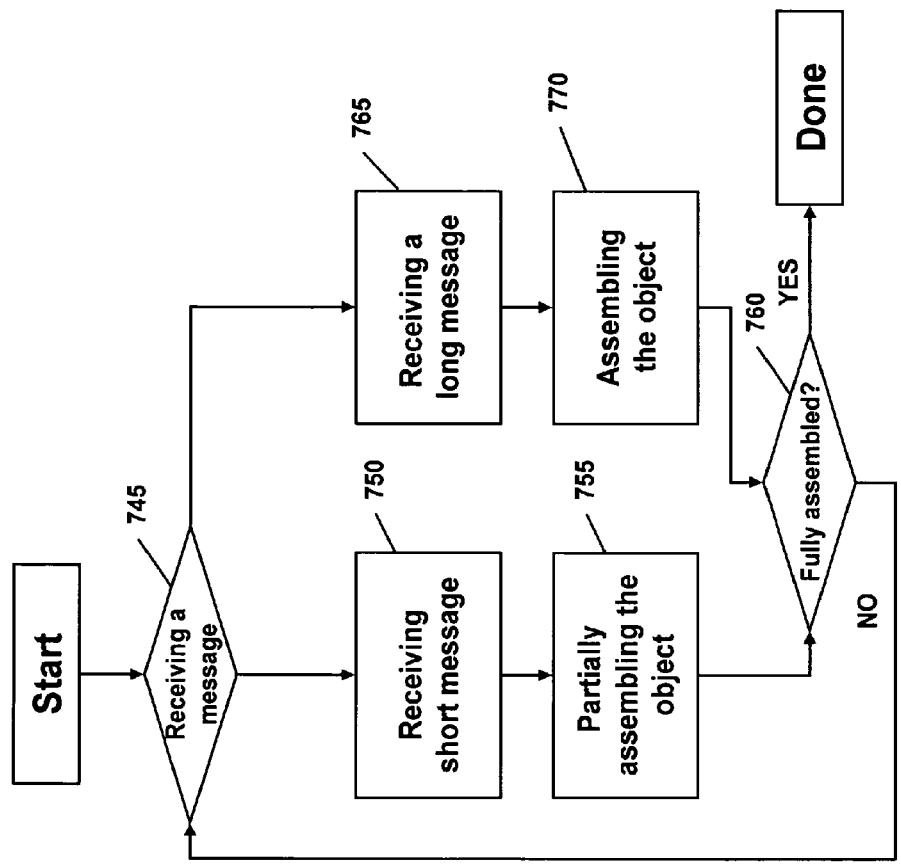
FIG. 20 illustrates an exemplary process of assembling a large object from a digital radio broadcast transmission in accordance with certain embodiments.

Once the messages are transmitted via digital radio broadcasting, a digital radio receiver receives and processes the messages. An exemplary process of assembling a large object from a digital radio broadcast transmission is shown in FIG. 20. In step 745, the receiver LOT client receives a message and determines whether it is a short message or a long message. This may be determined, for example, by examining the hdrLen field.

In step 750, the received message may be a short message having a number of fragments, and a short header. The short header includes the LotID, and typically hdrLen, repeat, and position fields as shown in FIG. 16. The position field describes the relative position of the first fragment of the short message. In step 755 the receiver LOT client partially assembles an object from the fragments of the short message. This comprises, for example, storing the fragments in a memory structure such as an array starting at the relative position described by the position field as described above. Advantageously, the receiver LOT client may begin assembling the object without having received an object description. This can be advantageous in increasing the efficiency of reassembly and the likelihood of successfully reassembling the object.

In step 755, the received message is a long message having a number of fragments and a long header. The number of fragments in each long message may be any suitable number such as 0 to 32 fragments. The long header includes the LotID, object description, and typically hdrLen, repeat (i.e. a repetition counter), and position fields as shown in FIG. 15. The object description includes a number of fields describing the object such as a fileName, mimeHash, fileSize, and discardTime as described above. The position field describes the relative position of the first fragment of the long message. In step 770, the receiver LOT client assembles the object from the fragments of the long message and the object description. This comprises associating the object description with a memory structure and storing the fragments in the memory structure. This could include, for example, storing the fragments in an array starting at the relative position described by the position field as described above. Once the receiver receives a long header describing the file size it can determine whether it has fully assembled the object by comparing the number of fragments received against the total file size. If the object has been fully assembled, the receiver LOT client can notify appropriate applications running on the host controller via, for example, an application programming interface (API). In some embodiments, the receiver discards the object at the discardTime whether or not it has been fully assembled. Depending on the configuration of the transmitter LOT client, the receiver may receive more long messages than short messages, or more short messages than long messages.

The LOT protocol could be used in a wide variety of digital radio broadcasting applications. For example, it could be used to transmit EPG data to digital radio receivers as described in commonly assigned U.S. Pat. No. 8,983,365 entitled "Systems and Methods for Communicating and Rendering Electronic Program Guide Information via Digital Radio Broadcast Transmission". It could also be used to transmit simple text files (weather, traffic, sports), JPEG images (slide show, station logos), HTML files (Web pages), and PDF files (newspapers, advertising). The mimeHash field in the object description can indicate the type of file. Other exemplary applications could include using LOT and existing ID3 tags (e.g., ID3 tags for "Attached Picture" and "General Encapsulated Object") to display album art during a song. Yet another exemplary application could be utilizing LOT protocol to implement an "on-demand interactive audio" system that would allow users to download selected audio programs.

The previously described embodiments of the present disclosure have many advantages, including:

One advantage is that in certain embodiments, the receiver may begin assembling objects without waiting to receive an object description. This can be advantageous in increasing the efficiency of reassembly and the likelihood of successfully reassembling the object.

Another advantage is that in certain embodiments the bandwidth efficiency can be balanced with the receiver efficiency by adjusting the number of long messages sent compared to the number of short messages sent.

Yet another advantage is that in certain embodiments, objects may be retransmitted repeatedly to increase the probability of successful receipt.

Still another advantage is that in certain embodiments object reassembly can begin with either a long message or a short message.

The exemplary approaches described may be carried out using any suitable combinations of software, firmware and hardware and are not limited to any particular combinations of such. Computer program instructions for implementing the exemplary approaches described herein may be embodied on a computer-readable medium, such as a magnetic disk or other magnetic memory, an optical disk (e.g., DVD) or other optical memory, RAM, ROM, or any other suitable memory such as Flash memory, memory cards, etc. Additionally, the disclosure has been described with reference to particular embodiments. However, it will be readily apparent to those skilled in the art that it is possible to embody the disclosure in specific forms other than those of the embodiments described above. The embodiments are merely illustrative and should not be considered restrictive. The scope of the disclosure is given by the appended claims, rather than the preceding description, and all variations and equivalents which fall within the range of the claims are intended to be embraced therein.

What is claimed is:

1. A method of preparing a large object for digital radio broadcast transmission comprising the steps of:
   determining whether an object and an object description have been received;
   assigning a unique identifier to an object that has been received in response to the determining;
   segmenting the object into a plurality of fragments;
   generating at least one long message having selected ones of the fragments and a long header comprising the unique identifier and the object description;
   generating at least one short message having selected ones of the fragments and a short header comprising the unique identifier; and
   communicating the at least one long message and the at least one short message to a digital radio broadcast transmitter,
   wherein more short messages than long messages are generated or more long messages than short messages are generated.

2. The method of claim 1 wherein the object description includes at least one of a file name, a version and a file size.

3. The method of claim 1 wherein the object description includes a discard time.

4. The method of claim 3 wherein the fragments are discarded at the discard time.

5. The method of claim 1 wherein the object description includes a Multipurpose Internet Mail Extensions hash.

6. The method of claim 1 wherein the at least one long header and the at least one short header include a repetition counter, wherein the plurality of fragments is repeatedly transmitted based on the repetition counter.

7. The method of claim 1 wherein the at least one long header includes a relative position of a first of the selected ones of the fragments.

8. The method of claim 1 wherein the at least one short header includes a relative position of a first of the selected ones of the fragments.

9. The method of claim 1 wherein more short messages than long messages are generated.

10. The method of claim 1 wherein more long messages than short messages are generated.

11. A non-transitory, tangible computer readable medium for preparing a large object for digital radio broadcast transmission comprising computer program instructions adapted to cause a processing system to execute steps comprising:
    determining whether an object and an object description have been received;
    assigning a unique identifier to an object that has been received in response to the determining;
    segmenting the object into a plurality of fragments;
    generating at least one long message having selected ones of the fragments and a long header comprising the unique identifier and the object description;
    generating at least one short message having selected ones of the fragments and a short header comprising the unique identifier; and
    communicating the at least one long message and the at least one short message to a digital radio broadcast transmitter,
    wherein more short messages than long messages are generated or more long messages than short messages are generated.

12. The non-transitory, tangible computer readable medium of claim 11, wherein the object description includes at least one of a file name, a version and a file size.

13. The non-transitory, tangible computer readable medium of claim 11, wherein the object description includes a discard time.

14. The non-transitory, tangible computer readable medium of claim 13, comprising program instructions for causing the processing system to discard the plurality of fragments at the discard time.

15. The non-transitory, tangible computer readable medium of claim 11, wherein the at least one long header and the at least one short header include a repetition counter, wherein the plurality of fragments is repeatedly transmitted based on the repetition counter.

16. The non-transitory, tangible computer readable medium of claim 11, wherein the at least one long header includes a relative position of a first of the selected ones of the fragments.

17. The non-transitory, tangible computer readable medium of claim 11, wherein the at least one short header includes a relative position of a first of the selected ones of the fragments.

18. The non-transitory, tangible computer readable medium of claim 11, wherein more short messages than long messages are generated.

19. The non-transitory, tangible computer readable medium of claim 11, wherein more long messages than short messages are generated.

20. A system for preparing a large object for digital radio broadcast transmission comprising:
- a processing system; and
- a memory coupled to the processing system, wherein the processing system is configured to execute steps comprising:
  - determining whether an object and an object description have been received;
  - assigning a unique identifier to an object that has been received;
  - segmenting the object into a plurality of fragments;
  - generating at least one long message having selected ones of the fragments and a long header comprising the unique identifier and the object description;
  - generating at least one short message having selected ones of the fragments and a short header comprising the unique identifier; and
  - communicating the at least one long message and the at least one short message to a digital radio broadcast transmitter,
  - wherein more short messages than long messages are generated or more long messages than short messages are generated.

21. The system of claim 20, wherein the object description includes at least one of a file name, a version and a file size.

22. The system of claim 20, wherein the object description includes a discard time.

23. The system of claim 22, wherein the processing system is configured to discard the plurality of fragments at the discard time.

24. The system of claim 20, wherein the at least one long header and the at least one short header include a repetition counter, wherein the plurality of fragments is repeatedly transmitted based on the repetition counter.

25. The system of claim 20, wherein the at least one long header includes a relative position of a first of the selected ones of the fragments.

26. The system of claim 20, wherein the at least one short header includes a relative position of a first of the selected ones of the fragments.

27. The system of claim 20, wherein more short messages than long messages are generated.

28. The system of claim 20, wherein more long messages than short messages are generated.

\* \* \* \* \*